United States Patent [19]

Hill

[11] 4,051,737
[45] Oct. 4, 1977

[54] VEHICLE BRAKES

[75] Inventor: Albert Charles Hill, Birmingham, England

[73] Assignee: Girling Limited, Birmingham, England

[21] Appl. No.: 578,930

[22] Filed: May 19, 1975

[30] Foreign Application Priority Data

May 24, 1974 United Kingdom ............... 23223/74

[51] Int. Cl.² ...................... F16H 21/54; F16D 51/22
[52] U.S. Cl. ...................................... 74/110; 188/343
[58] Field of Search ............. 74/99 A, 110; 188/343, 188/365, 368

[56] References Cited

U.S. PATENT DOCUMENTS

| 3,302,473 | 2/1967 | Lowry et al. | 74/110 |
| 3,317,010 | 5/1967 | Newstead | 188/343 |
| 3,362,506 | 1/1968 | Mossey | 74/110 |
| 3,388,606 | 6/1968 | Hill | 188/343 |
| 3,511,103 | 5/1970 | Cox, Jr. | 188/343 |
| 3,599,763 | 8/1971 | Bailey | 188/343 |
| 3,647,034 | 3/1970 | Wieger | 188/343 |
| 3,831,720 | 8/1974 | Williams | 188/343 |

FOREIGN PATENT DOCUMENTS

| 282,052 | 9/1965 | Australia | 188/343 |
| 1,308,974 | 10/1962 | France | 74/110 |
| 1,151,352 | 5/1969 | United Kingdom | 188/343 |
| 1,255,141 | 11/1971 | United Kingdom | 188/343 |

Primary Examiner—C. J. Husar
Attorney, Agent, or Firm—Scrivener, Parker, Scrivener & Clarke

[57] ABSTRACT

In a wedge-type vehicle brake actuator with a cage assembly unattached to the wedge member the travel of the cage assembly is limited by an engagement with one follower member. With an assymetric cage assembly the assembly of the cage assembly into the housing is prevented by an engagement with a follower member when the cage assembly is assembled the wrong way.

8 Claims, 3 Drawing Figures

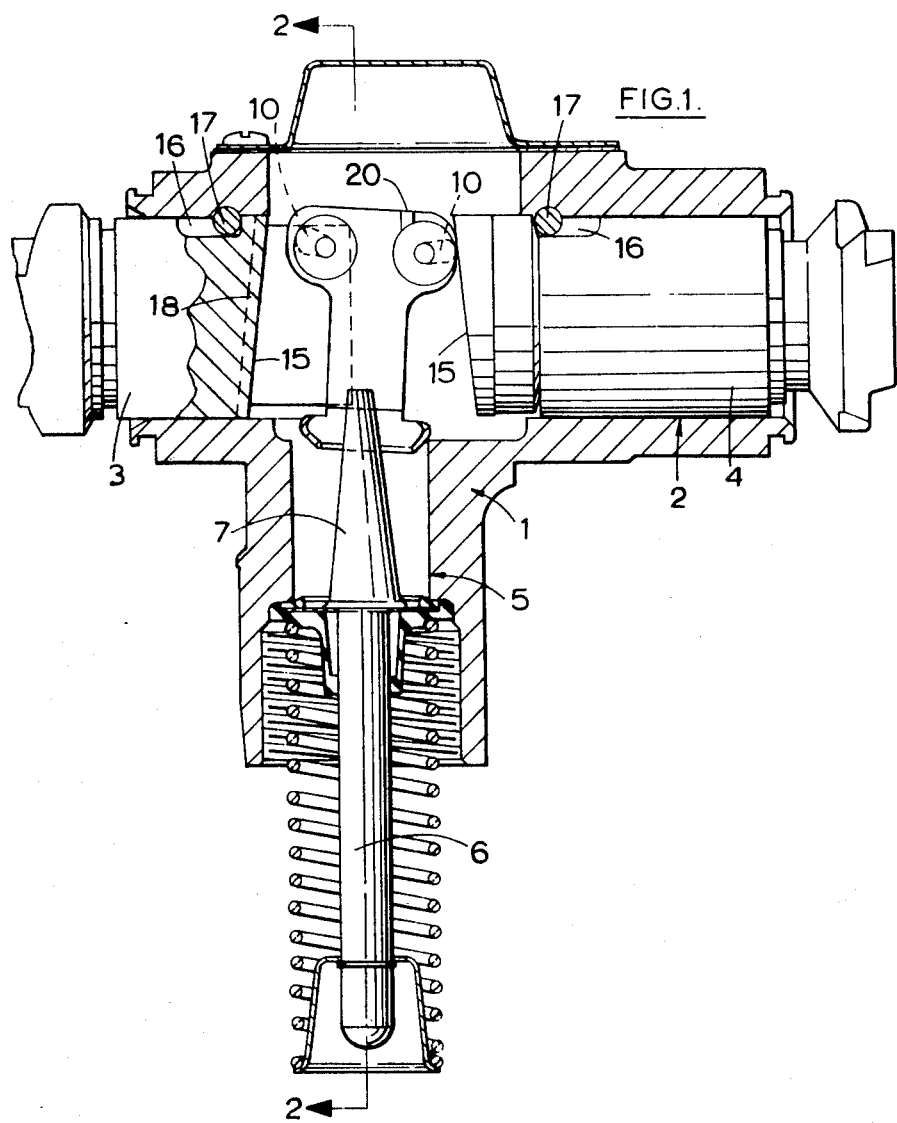

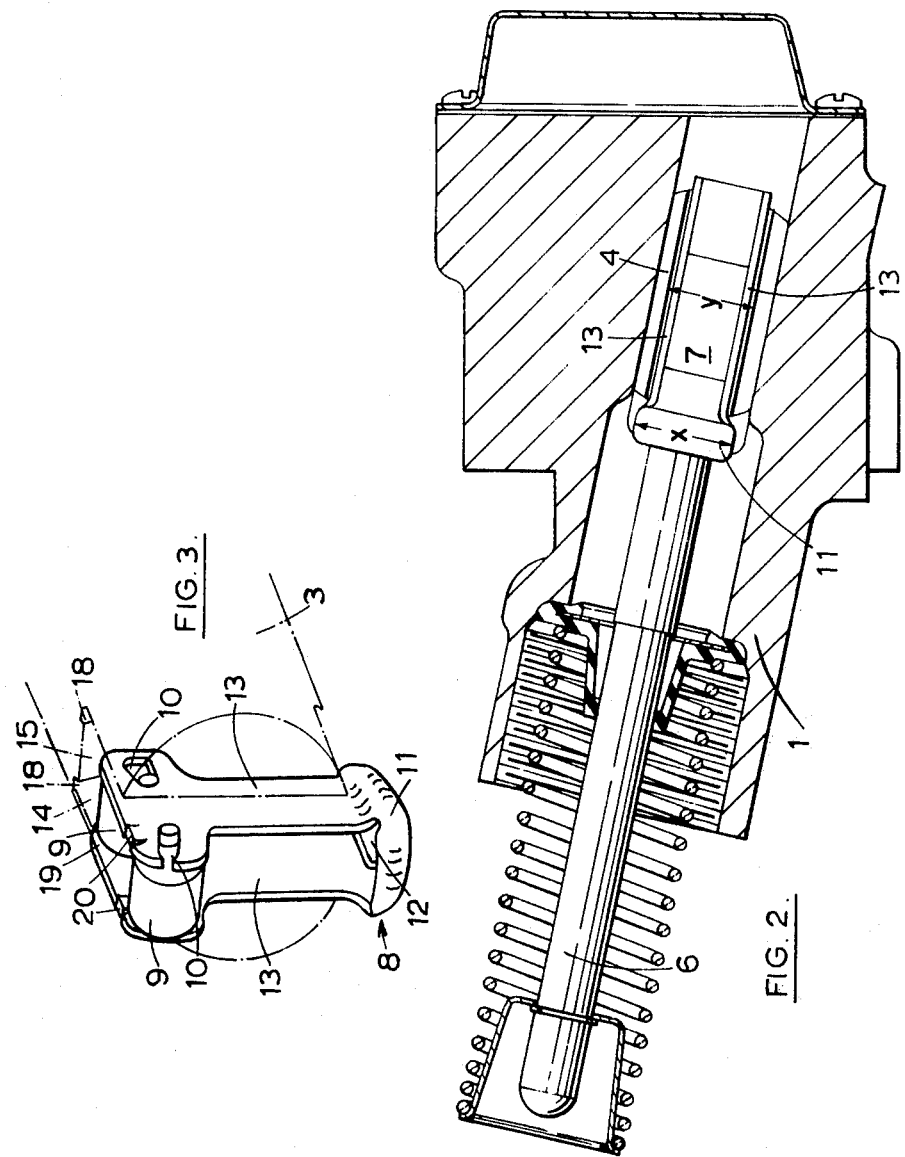

VEHICLE BRAKES

SPECIFIC DESCRIPTION

This invention relates to a vehicle brake actuator incorporating a wedge-type actuating means.

Actuators are known of the kind including a housing having wedge-actuating means comprising a wedge member for displacing at least one friction element of the brake towards engagement with a brake rotor, follower members in the housing displaceable apart in response to movement of said wedge member and presenting inclined surfaces arranged one on each side of said wedge member, at least one roller interposed between each inclined surface and the co-operating surface of the wedge member, and a cage in which the rollers are retained.

In actuators of this kind the angular movement of the cage to accommodate roller movement during operation is difficult to achieve unless the cage and rollers are mounted separately from the wedge as an independent cage assembly. The problem has arisen that during servicing or handling in storage of such actuator assemblies the cage assembly can become separated from the wedge member and, with the inclined surfaces of the follower members at their maximum separation, the cage assembly can become displaced beyond maximum operational travel so that the rollers are no longer in the gap between the follower members. Subsequent recovery of the cage assembly may be difficult without dismantling the actuator assembly.

One known solution is to mount the cage on the actuating rod and to spring-load the rod and cage assembly to a stop on the housing. However, this requires an increased number of components.

According to the invention in a vehicle brake actuator of the kind set forth the cage and rollers constitute an independent cage assembly so constructed that its travel in the direction of movement of the wedge member is limited by engagement of a part of the cage assembly with at least one of the follower members, the travel of said one follower member outwardly of the housing being limited by suitable stop means.

Preferably the travel of the cage assembly is limited by an engagement between the cage and said one follower member.

At least one of the follower members is preferably provided with a transverse groove in which the cage is guided, and the cage is provided with a projecting portion of greater width than that of the groove to limit its travel.

The cage is conveniently pressed from a single sheet of metal to have an enlarged head with a central aperture for the wedge member and two parallel depending legs between which the rollers are journalled in suitable apertures.

In the Complete Specification of our U.K. Pat. No. 1,425,324 we have described and claimed a wedge actuating means of the kind set forth in which the cage is provided on opposite sides of the wedge member with roller spindle receiving apertures of different outline.

It is important that such an asymetrical cage and roller assembly should be assembled into the actuator housing the correct way.

According to another aspect of our invention when the cage and roller assembly is asymetric said assembly is provided with abutment means which baulks with a part of a follower member when said assembly is misorientated by 180° and is offered to said follower member.

When one of said follower members is provided with a transverse slot for guiding the cage and roller assembly said assembly may conveniently be provided with a projection which prevents the cage and roller assembly from fully entering the slot when the cage and roller assembly is misorientated by 180°.

The invention is applicable both to actuator assemblies in which the wedge member is urged inwardly to apply the brakes and to those in which the wedge member is pulled outwardly.

An actuator in accordance with the invention will now be described with reference to the accompanying drawings in which:

FIG. 1 is a section of the actuator with the follower members being shown at their maximum separation and with the cage detached from the wedge member and in its position of maximum travel as determined by engagement of the enlarged head of the cage with the left hand follower member;

FIG. 2 is a section on the line 2—2 of FIG. 1 with the parts in the same position; and FIG. 3 is a perspective view showing the co-operation between the cage and rollers with one of the follower members, the cage being shown in its position of maximum travel with its enlarged head in contact with that follower member.

The actuator comprises a housing 1 having aligned longitudinal bores 2 in which work respective follower members comprising tappets 3 and 4, and a transverse bore 5 for an actuator rod 6 with a wedge member 7 at its inner end.

A cage 8 carries a pair of rollers 9 journalled in triangulated or pear-shaped apertures 10, which are the subject of our co-pending U.K. patent application No. 56475/72 now U.K. Pat. No. 1,425,324. The apertures 10 are of different shapes and so the cage is asymmetric.

The cage 8 is pressed from a single sheet of metal to have a mushroom-shaped head 11 provided with a central aperture 12 for the wedge member 7 and a pair of parallel depending legs 13.

The inner end of the tappet 3 is formed with a transverse slot 14 of sufficient width 4, as shown in FIG. 2, to admit the legs 13 of the cage with clearance but not sufficiently wide for the enlarged head 11 of width x to enter the slot. The base of the slot 14 and the inner end of the tappet 4 are formed with faces 15 complementarily inclined to the faces of the wedge member 7, and in use each roller contacts the face 15 of its adjacent tappet and the adjacent inclined face of the wedge member 7. The inner end of the slot 14 is also formed with two spaced parallel grooves 18 to receive projecting parts 19 of the cage.

To prevent insertion of the asymmetric cage and roller assembly into the groove 14 when said assembly is misorientated by 180° the cage is provided with a pair of projecting tags 20. The width of the cage at the tags is greater than the width $y$ of slot 14 in tappet 3. The cage is shown correctly orientated in FIG. 1, but if the cage were to be misorientated by 180° the tags 20 would baulk with the outer surface of tappet 3 adjacent the entrance to slot 14.

The maximum separation of the tappets 3 and 4 is determined by the ends of recesses 16 in the sides of the tappets engaging with pins 17 fixed in the housing.

During storage it is possible for the assembly to be mishandled so that the tappets assume their positions of maximum separation whilst the wedge member 7 is in a fully retracted position, as shown in FIG. 1. The cage may then become separated from the wedge member 7, as shown, but is prevented from moving along the transverse bore in its normal brake-applying direction so that the rollers do not become displaced from between the tappets by the engagement of the head 11 with one of the tappets. This is shown most clearly in FIG. 2 where it can be seen that the width x of the head 11 is greater than the width y of the slot 14.

Even when the tappets and wedge member are fully retracted the cage cannot become displaced from its normal working position thereby facilitating rapid reassembly of the assembly following replacement of a component of the assembly such as the wedge or the rod seal.

The wedge and cage are thus always maintained in permanent alignment.

The invention makes it unnecessary to provide separate stop means for the cage and thus keeps the number of parts in the assembly to a minimum.

It will be appreciated that any suitable form of abutment could be provided on the cage to prevent excessive travel. For example, the cage could be provided with projections extending longitudinally of said through-bore so as to extend farther in that direction than the maximum separation of the inclined surfaces 15.

The abutment on the cage which prevents excessive travel may also be utilised during normal operation to locate the base of the cage while swinging motion of the rollers and top of the cage takes place in the manner described in the Complete Specification of our co-pending patent application No. 51735/72 now U.K. Pat. No. 1,447,358.

Although the abutment limiting travel of the cage assembly has been shown on the cage, it will be appreciated that the reduced portions of one roller could be extended axially of the roller to provide an abutment for engagement with a suitable abutment on one of the follower members.

I claim:

1. A vehicle brake actuator comprising a housing, a wedge member in the housing, follower members in the housing displaceable apart in response to movement of said wedge member and presenting inclined surfaces arranged one on each side of said wedge member, at least one roller interposed between each of said inclined surfaces and the co-operating surface of the wedge member, and a cage in which said rollers are retained, wherein said cage and said rollers constitute an independent cage assembly unattached to said wedge member, said cage assembly and one of said follower members are formed with corresponding abutment means which limit the travel of the cage assembly in the direction of movement of said wedge member, and stop means are provided for limiting movement outwardly of the housing of said one follower member.

2. A vehicle brake actuator as in claim 1 in which said cage is formed with said abutment means.

3. A vehicle brake actuator as in claim 2 wherein said one follower member is formed with a groove in which is guided a part of the cage, said cage being formed with a projecting portion of greater width than the width of said groove to limit its travel.

4. A vehicle brake actuator as in claim 3 wherein said projecting portion of said cage comprises an enlarged head formed with a central aperture to receive said wedge member, said cage being provided with two parallel legs depending from said head and between which said rollers are journalled.

5. A vehicle brake actuator as in claim 1 in which stop means are provided for limiting the outward travel of both follower members.

6. A vehicle brake actuator as in claim 1 in which an actuating member is attached to said wedge member and is accessible to one side of said housing, and the arrangement is such that the follower members are urged outwardly of the housing when the rod is moved inwardly.

7. A vehicle brake actuator comprising a housing, a wedge member in the housing, follower members in the housing displaceable apart in response to movement of said wedge member and presenting inclined surfaces arranged one on each side of said wedge member, at least one roller interposed between each of said inclined surfaces and the co-operating surface of the wedge member, and a cage in which the rollers are retained, wherein said cage and roller assembly is asymetric about its direction of travel, and the cage and roller assembly and one of said follower members are provided with corresponding abutment means which prevent assembly of the cage assembly into the housing when the cage assembly is misorientated with respect to the housing by 180° about the direction of travel of the wedge member.

8. A vehicle brake actuator as in claim 7 wherein said one follower member is formed with a groove in which said cage is guided, and said abutment means on the cage assembly comprises a projection on the cage which prevents insertion of the cage into a working position in said groove.

* * * * *